(12) United States Patent
Huang et al.

(10) Patent No.: US 12,288,358 B2
(45) Date of Patent: Apr. 29, 2025

(54) METHOD OF SENSOR FUSION FOR HARMONIZING DATA FROM MULTIPLE DATA SOURCES

(71) Applicant: Automotive Research & Testing Center, Lugong (TW)

(72) Inventors: Wei-Xiang Huang, Lugong (TW); Yi-Jie Lin, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 404 days.

(21) Appl. No.: 18/073,918

(22) Filed: Dec. 2, 2022

(65) Prior Publication Data

US 2024/0185456 A1   Jun. 6, 2024

(51) Int. Cl.
| | |
|---|---|
| *G06T 7/73* | (2017.01) |
| *G01S 17/86* | (2020.01) |
| *G01S 17/89* | (2020.01) |
| *G01S 17/931* | (2020.01) |
| *G06V 10/762* | (2022.01) |
| *G06V 10/80* | (2022.01) |

(52) U.S. Cl.
CPC ............... *G06T 7/74* (2017.01); *G01S 17/86* (2020.01); *G01S 17/89* (2013.01); *G01S 17/931* (2020.01); *G06V 10/762* (2022.01); *G06V 10/803* (2022.01); *G06T 2207/10028* (2013.01); *G06T 2207/20081* (2013.01); *G06T 2207/20221* (2013.01)

(58) Field of Classification Search
CPC ............. G06T 7/74; G06T 2207/10028; G06T 2207/20081; G06T 2207/20221; G01S 17/86; G01S 17/89; G01S 17/931; G06V 10/762; G06V 10/803
USPC .......................................................... 382/103
See application file for complete search history.

(56) References Cited

U.S. PATENT DOCUMENTS

| | | | | |
|---|---|---|---|---|
| 10,229,332 B2 * | 3/2019 | Hu | ........................... | G06F 18/22 |
| 10,726,567 B2 * | 7/2020 | Lee | ............................. | G06T 7/77 |
| 10,841,483 B1 | 11/2020 | Hunt | | |

(Continued)

FOREIGN PATENT DOCUMENTS

| | | |
|---|---|---|
| CN | 109655825 B | 7/2020 |
| CN | 112639882 A | 4/2021 |
| TW | 201812700 A | 4/2018 |

*Primary Examiner* — Negussie Worku
(74) *Attorney, Agent, or Firm* — Birch, Stewart, Kolasch & Birch, LLP (57) ABSTRACT

A method includes: selecting, from among a series of images, a candidate image that was captured at an image-capturing time instant corresponding to a point-cloud-generating time instant at which a point cloud was generated; generating a two-dimensional data set from the point cloud; superimposing the two-dimensional data set on the candidate image to result in a superimposed image; obtaining a derived distance inconsistency between the candidate image and the two-dimensional data set in the superimposed image; feeding the derived distance inconsistency into a conversion model to obtain a derived time difference; calculating a target time instant based on the derived time difference and the image-capturing time instant of the candidate image; and selecting, from among the series of images that have been received from the image capturing device, a target image that was captured at a time instant the closest to the target time instant.

9 Claims, 5 Drawing Sheets

(56) References Cited

U.S. PATENT DOCUMENTS

| | | |
|---|---|---|
| 10,859,684 B1 | 12/2020 | Nabatchian |
| 10,999,511 B2 | 5/2021 | Yang et al. |
| 11,113,584 B2 * | 9/2021 | Deng .................... G01S 17/86 |
| 2017/0097413 A1 * | 4/2017 | Gillian .................. G01S 7/4004 |
| 2018/0108134 A1 * | 4/2018 | Venable ................. G06T 7/521 |
| 2021/0003710 A1 * | 1/2021 | Tan ....................... G01S 17/89 |
| 2021/0104056 A1 * | 4/2021 | Lee ...................... G01S 17/931 |
| 2021/0215805 A1 * | 7/2021 | Lever .................... G01S 17/894 |
| 2021/0394781 A1 * | 12/2021 | Li ......................... B60W 30/09 |

* cited by examiner

FIG.1

Training conversion model based on training data sets —21

METHOD OF SENSOR FUSION FOR HARMONIZING DATA FROM MULTIPLE DATA SOURCES

FIELD

The disclosure relates to a method of sensor fusion, and more particularly to a method of sensor fusion for harmonizing data from multiple data sources.

BACKGROUND

According to SAE J3016™ defined by Society of Automotive Engineers (SAE) International, vehicle autonomy can be categorized into six levels, i.e., "Level 0"—no automation, "Level 1"—driver assistance, "Level 2"—partial automation, "Level 3"—conditional automation, "Level 4"—high automation, and "Level 5"—full automation. For example, in the technologies used in conventional vehicles, a function of "Traffic Jam Assist (TJA)" corresponds to "Level 3", and an autonomous drive (AD) system corresponds to "Level 4".

Sensor fusion is a process of combining data from various sensors, e.g., a camera, a radio detection and ranging (radar) sensor, a light detection and ranging (lidar) sensor, or the like. Sensor fusion plays an important role in vehicle autonomy. In particular, the camera is used to generate visual data (images) that is related to physical objects such as pedestrians, traffic signs or the like; the lidar sensor is used to generate physical-feature data that is exemplarily related to a distance between a target object and the lidar sensor, an orientation of the target object relative to the lidar sensor, a height of the target object, a moving speed of the target object, a posture or pose of the target object or the like. However, not only are the various sensors often quite different in terms of data format (e.g., the visual data generated by the camera and the physical-feature data generated by the lidar sensor are different in format), but they are also often quite different in terms of the sampling rates they adopt (e.g., the camera captures an image every 33 ms, while the lidar sensor collects a point cloud every 100 ms). Such differences cause inconsistency in the data from the various sensors, and impose challenges on harmonizing the data from the various sensors in the aspects of temporal and spatial relationships.

SUMMARY

Therefore, an object of the disclosure is to provide a method of sensor fusion for harmonizing data from multiple data sources.

According to the disclosure, the method is adapted to be implemented by a computing device that stores a conversion model. The computing device is electrically connected to an image capturing device and a light detection and ranging (lidar) sensor that are mounted on a mobile object. The image capturing device repeatedly captures a series of images that contain obstacles around the mobile object and transmits the series of images to the computing device. The lidar sensor repeatedly generates a series of point clouds that represent the obstacles around the mobile object and transmits the series of point clouds to the computing device. The series of images are captured respectively at a series of image-capturing time instants. Each of the point clouds is generated at a point-cloud-generating time instant. The method includes, with respect to each of the point clouds, steps of:

selecting, from among the series of images that have been received from the image capturing device, a candidate image that was captured at an image-capturing time instant corresponding to the point-cloud-generating time instant at which the point cloud was generated;

generating, from the point cloud, a two-dimensional data set that is a two-dimensional representation of the point cloud;

superimposing the two-dimensional data set on the candidate image to result in a superimposed image;

obtaining a derived distance inconsistency between the candidate image and the two-dimensional data set in the superimposed image;

feeding the derived distance inconsistency into the conversion model to obtain a derived time difference;

calculating a target time instant based on the derived time difference and the image-capturing time instant of the candidate image; and selecting, from among the series of images that have been received from the image capturing device, a target image that was captured at a time instant the closest to the target time instant.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
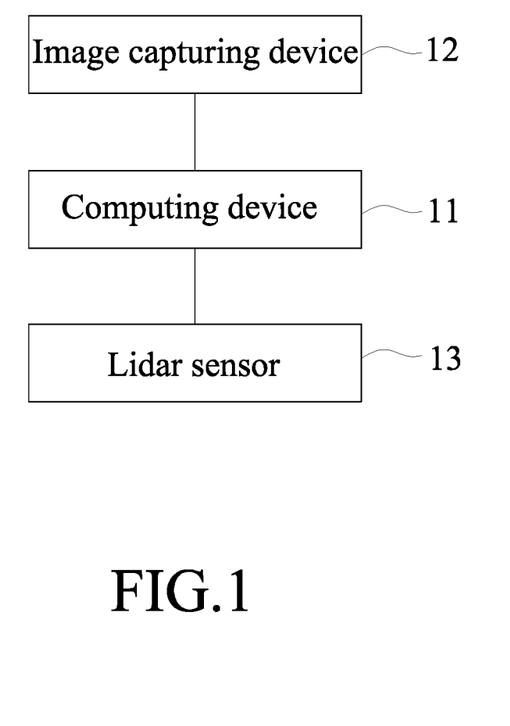
FIG. 1 is a block diagram illustrating an example of a system of sensor fusion according to an embodiment of the disclosure.

Referring to FIG. 1, an embodiment of a system of sensor fusion according to the disclosure is illustrated. The system includes a computing device 11, an image capturing device 12 and a light detection and ranging (lidar) sensor 13. The computing device 11 is electrically connected to the image capturing device 12 and the lidar sensor 13. The image capturing device 12 and the lidar sensor 13 are mounted on a mobile object. In this embodiment, the mobile object is implemented by a vehicle or a mobile robot. However, implementation of the mobile object is not limited to the disclosure herein and may vary in other embodiments.

The image capturing device 12 may be implemented by a camera or a video recorder, but is not limited thereto. The image capturing device 12 is configured to repeatedly capture a series of images that contain obstacles around the mobile object (e.g., other vehicles running in front of the mobile object) and transmit the series of images to the computing device 11. The series of images are captured respectively at a series of image-capturing time instants. In this embodiment, the image capturing device 12 captures an image every 33 ms, but a sampling rate of the image capturing device 12 is not limited to what is disclosed herein and may vary in other embodiments.

The lidar sensor 13 is configured to repeatedly generate a series of point clouds that represent the obstacles around the mobile object and transmit the series of point clouds to the computing device 11. Each of the point clouds is generated at a point-cloud-generating time instant. In this embodiment, the lidar sensor 13 generates a point cloud every 100 ms, but a sampling rate of the lidar sensor 13 is not limited to what is disclosed herein and may vary in other embodiments.

It should be noted that in practice, a difference between an image-capturing time instant at which the image capturing device 12 captures an image and an image-receiving time instant at which the computing device 11 receives the image is negligible and the two time instants may be regarded as the same; likewise, a difference between a point-cloud-generating time instant at which the lidar sensor 13 generates a point cloud and a point-cloud-receiving time instant at which the computing device 11 receives the point cloud is negligible and the two time instants may be regarded as the same.

The computing device 11 may be implemented to be a personal computer (PC), a smartphone, a system on a chip (SoC), or any circuit configurable/programmable in a software manner and/or hardware manner to implement functionalities discussed in this disclosure, but implementation thereof is not limited to what are disclosed herein and may vary in other embodiments.

The computing device 11 stores a conversion model. The conversion model is established using a RegNet-based machine learning algorithm. The computing device 11 further stores a plurality of training data sets that are obtained in similar ways. The computing device 11 trains the conversion model based on the training data sets. Since all of the training data sets are obtained in similar ways, only details of obtaining one of the training data sets are to be described in the following paragraphs for the sake of brevity.

Each of the training data sets contains a training time difference and a training distance inconsistency. The training time difference is a time span between a first training time instant, at which the image capturing device 12 captures a training image of a training scene (e.g., a vehicle running in front of another vehicle), and a second training time instant, at which the lidar sensor 13 generates a training point cloud that is related to the training scene.

Object clustering is performed on the training point cloud to result in a plurality of groups of training data points, and the groups of training data points are respectively designated as training point-cloud objects. Object clustering is also performed on the training image to result in a plurality of training image objects. For example, implementation of object clustering may be one of density-based clustering and k-means clustering, but is not limited thereto.

Then, the training point cloud, which includes the training point-cloud objects, is converted into a two-dimensional training data set based on a training coordinate-transformation parameter set that is related to coordinate transformation between a three-dimensional coordinate system of the training point cloud and a two-dimensional coordinate system of the training image. The two-dimensional training data set is superimposed on the training image to result in a training superimposed image.

From among the training image objects, at least one training to-be-compared object is selected, wherein a position of the training to-be-compared object corresponds to a position of one of the training point-cloud objects in the training superimposed image. In addition, a geometric feature of the training to-be-compared object is determined, and a geometric feature of said one of the training point-cloud objects is determined. In this embodiment, the geometric feature is exemplarily a centroid (i.e., a geometric center), but is not limited thereto. Thereafter, a distance between the geometric feature of the training to-be-compared object and the geometric feature of said one of the training point-cloud objects in the superimposed image is calculated to serve as the training distance inconsistency.

Referring to FIGS. 2 to 5, an embodiment of a method of sensor fusion according to the disclosure is illustrated. The method includes a model-establishing procedure and a harmonization procedure.

Figure 2:
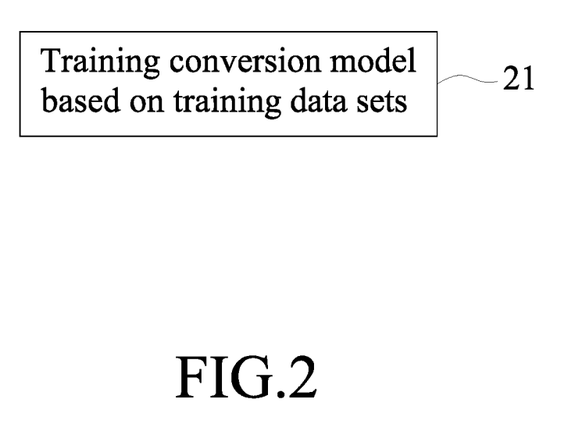
FIGS. 2 to 5 are flow charts cooperatively illustrating an example of a method of sensor fusion according to an embodiment of the disclosure.

Referring to FIG. 2, the model-establishing procedure includes step 21. In step 21, the computing device 11 trains, based on the training data sets, the conversion model that was established using the machine learning algorithm. After having been trained, the conversion model is capable of generating a time difference output based on a distance inconsistency input. It should be noted that the conversion model generates the time difference output in an adaptive manner (i.e., generating different time difference outputs respectively for different distance inconsistency inputs), and the time difference output thus generated can be utilized to compensate for a time span between two time instants respectively at which the image capturing device 12 captures an image and the lidar sensor 13 generates a point cloud. In this way, data from various data sources can be effectively harmonized (made consistent).

Figure 3:
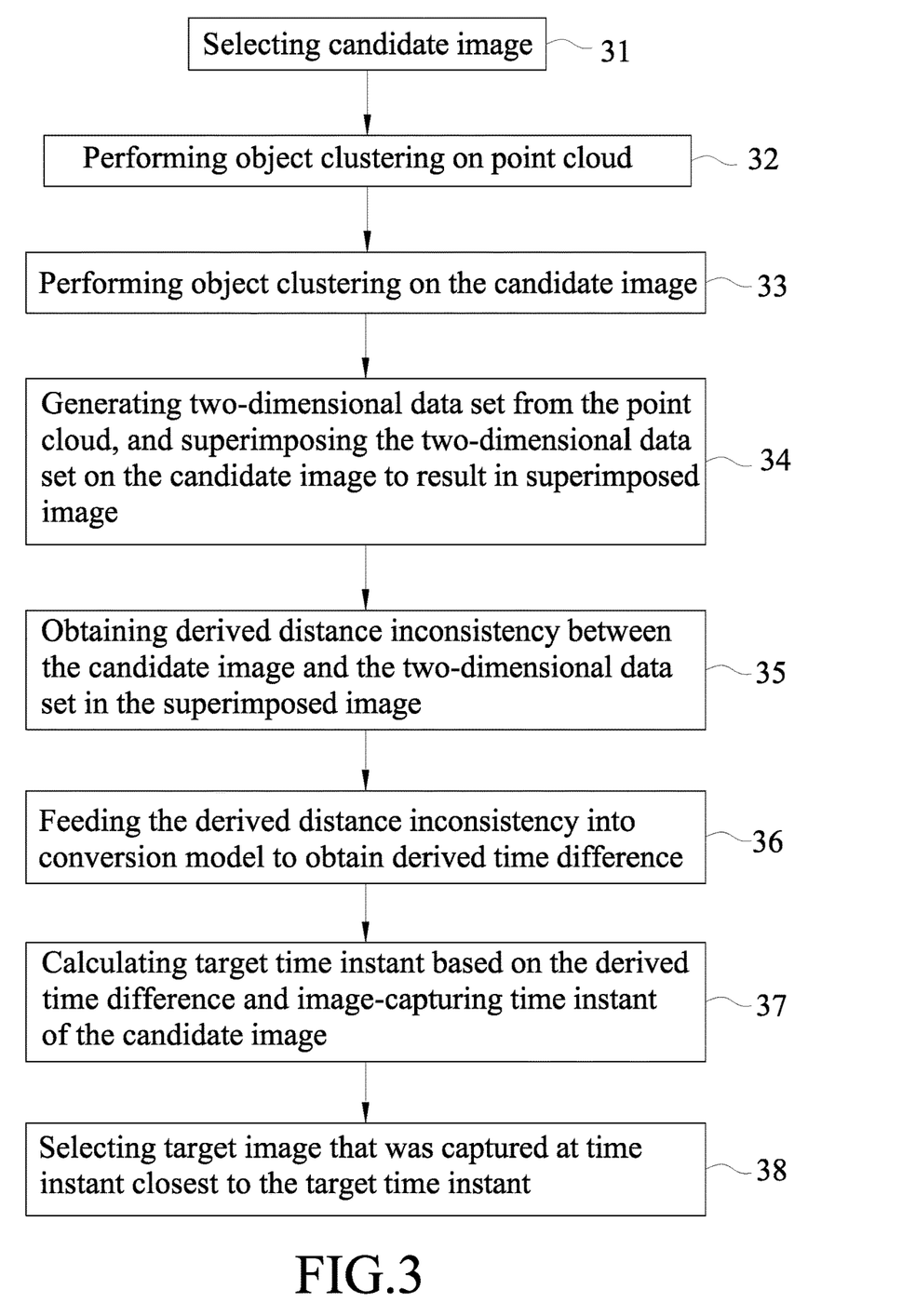

For each of the point clouds received by the computing device 11 from the lidar sensor 13, the computing device 11 executes the harmonization procedure, which includes steps 31 to 38 illustrated in FIG. 3 and delineated below.

In step 31, the computing device 11 selects, from among the series of images that have been received from the image capturing device 12, a candidate image that was captured at an image-capturing time instant corresponding to the point-cloud-generating time instant at which the point cloud was generated. In this embodiment, the image-capturing time instant of the candidate image may be one of the time instants at which the series of images were captured that is the closest to the point-cloud-generating time instant of the point cloud or may be equal to the point-cloud-generating time instant of the point cloud.

In step 32, the computing device 11 performs object clustering on the point cloud to obtain a plurality of groups of data points, and designates the groups of data points respectively as point-cloud objects. In this embodiment, the object clustering performed on the point cloud is one of density-based clustering and k-means clustering, but is not limited thereto.

In step 33, the computing device 11 performs object clustering on the candidate image to obtain a plurality of image objects. In this embodiment, object clustering performed on the candidate image is one of density-based clustering and k-means clustering, but is not limited thereto.

In step 34, the computing device 11 generates, from the point cloud, a two-dimensional data set that is a two-dimensional representation of the point cloud, and superimposes the two-dimensional data set on the candidate image to result in a superimposed image.

Figure 4:
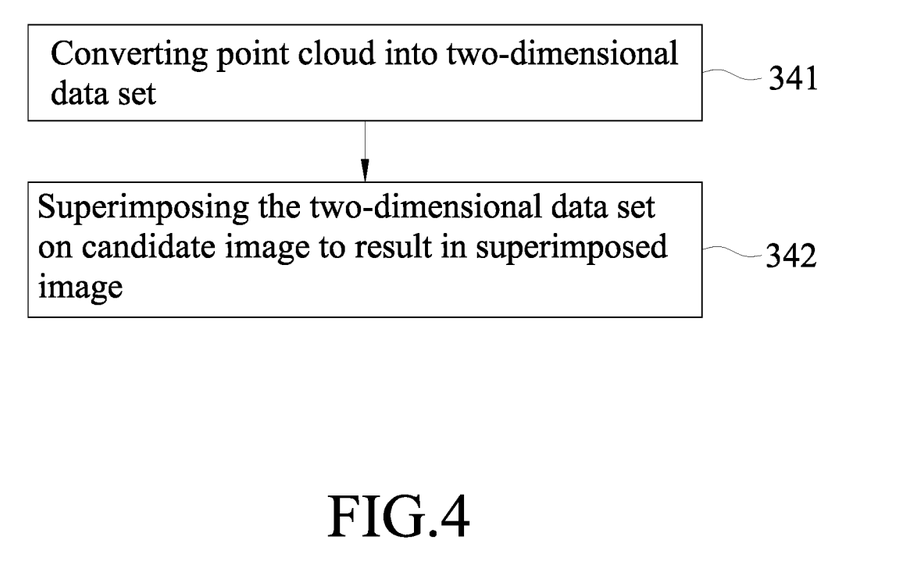

More specifically, step 34 includes sub-steps 341 and 342 as shown in FIG. 4 and delineated below.

In sub-step 341, the computing device 11 converts the point cloud into the two-dimensional data set based on a coordinate-transformation parameter set that is related to coordinate transformation between a three-dimensional coordinate system of the point cloud and a two-dimensional coordinate system of the candidate image. It is worth to note that the coordinate-transformation parameter set includes an extrinsic matrix and an intrinsic matrix. The extrinsic matrix is established based on a mounting position of the lidar sensor 13 and a mounting position of the image capturing device 12. The intrinsic matrix is established based on a focal length of the image capturing device 12 and a coordinate set of a center of the candidate image, wherein the focal length of the image capturing device 12 is represented by a number of pixels. Since techniques of converting a point cloud into a two-dimensional data set have been well known to one skilled in the relevant art (e.g., see information at https://patents.google.com/patent/US10859684B1/en), detailed explanation of the same is omitted herein for the sake of brevity.

In sub-step 342, the computing device 11 superimposes the two-dimensional data set on the candidate image to result in the superimposed image.

In step 35, the computing device 11 obtains a derived distance inconsistency between the candidate image and the two-dimensional data set in the superimposed image.

Figure 5:
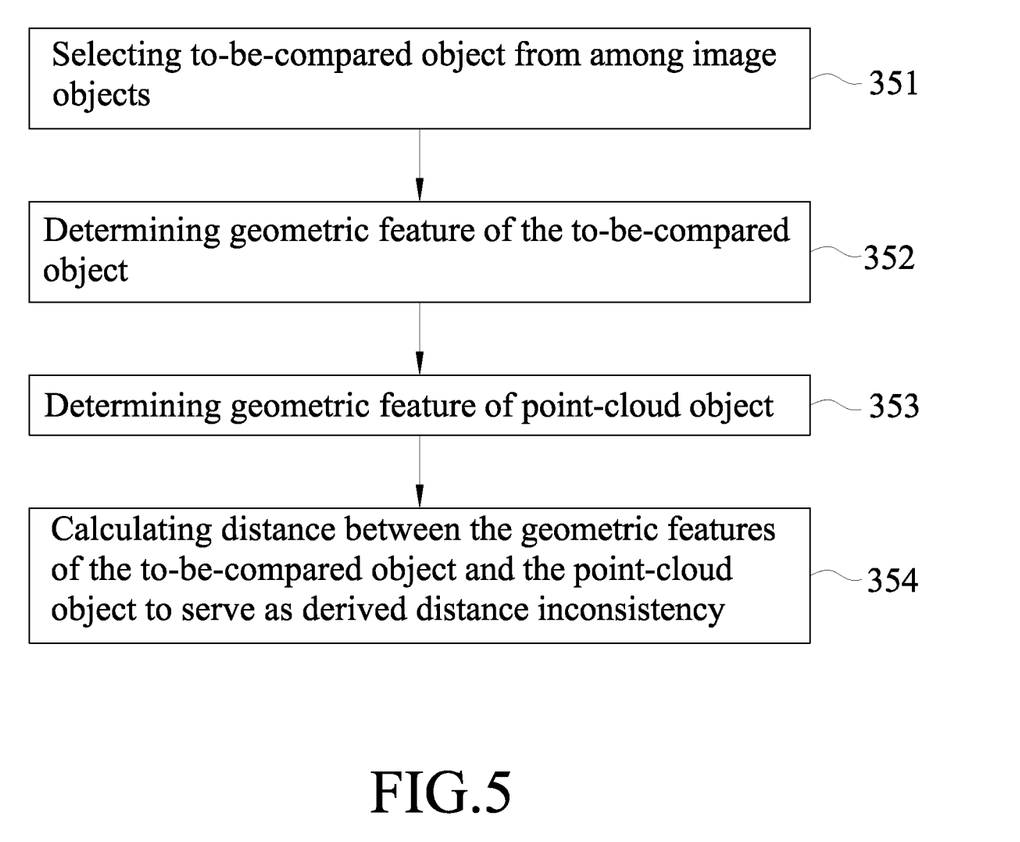

More specifically, step 35 includes sub-steps 351 to 354 as shown in FIG. 5 and delineated below.

In sub-step 351, from among the image objects, the computing device 11 selects at least one to-be-compared object, wherein a position of the to-be-compared object corresponds to a position of one of the point-cloud objects in the superimposed image. In other words, among the image objects, the to-be-compared object is the closest to the two-dimensional data set corresponding to the point-cloud objects.

In sub-step 352, the computing device 11 determines a geometric feature (i.e., a centroid) of the to-be-compared object. In this embodiment, the determination of the geometric feature of the to-be-compared object is made by using one of a random sample consensus (RANSAC) algorithm and an oriented FAST and rotated BRIEF (ORB) algorithm, but is not limited thereto.

In sub-step 353, the computing device 11 determines a geometric feature (i.e., a centroid) of said one of the point-cloud objects. In this embodiment, the determination of the geometric feature of said one of the point-cloud objects is made by using one of a RANSAC algorithm and an ORB algorithm, but is not limited thereto.

In sub-step 354, the computing device 11 calculates a distance between the geometric feature of the to-be-compared object and the geometric feature of said one of the point-cloud objects in the superimposed image to serve as the derived distance inconsistency. In this embodiment, the computing device 11 calculates one of an Euclidean distance and a Mahalanobis distance between the geometric feature of the to-be-compared object and the geometric feature of said one of the point-cloud objects to serve as the derived distance inconsistency, but is not limited thereto.

It is worth noting that in a scenario where the computing device 11 selects a plurality of to-be-compared objects from among the image objects where positions respectively of the to-be-compared objects correspond respectively to positions respectively of multiple ones of the point-cloud objects in the superimposed image, the computing device 11 determines geometric features respectively of the to-be-compared objects, and determines geometric features respectively of the multiple ones of the point-cloud objects. Then, the computing device 11 calculates, for each of the to-be-compared objects, a distance between the geometric feature of the to-be-compared object and the geometric feature of a corresponding one of the multiple ones of the point-cloud objects. Thereafter, the computing device 11 calculates an arithmetic average of the distances corresponding respectively to the to-be-compared objects to serve as the derived distance inconsistency.

In step 36, the computing device 11 feeds the derived distance inconsistency into the conversion model to obtain a derived time difference.

In step 37, the computing device 11 calculates a target time instant based on the derived time difference and the image-capturing time instant of the candidate image. For example, the computing device 11 calculates a sum of the derived time difference and the image-capturing time instant as the target time instant. In this way, a time span between the image-capturing time instant of the candidate image and the point-cloud-generating time instant of the point cloud may be compensated for by using the derived time difference.

In step 38, the computing device 11 selects, from among the series of images that have been received from the image capturing device 12, a target image that was captured at a time instant the closest to the target time instant.

It is worth to note that inconsistency that exists between images captured by the image capturing device 12 and point clouds generated by the lidar sensor 13 may be attributed to a difference in sampling rates of the image capturing device 12 and the lidar sensor 13 (i.e., the image capturing device 12 captures an image every 33 ms and the lidar sensor 13 generates a point cloud every 100 ms) and a difference in onset timing of the image capturing device 12 and the lidar sensor 13 (i.e., different start time instants respectively at which the image capturing device 12 starts to capture images and the lidar sensor 13 starts to generate point clouds). Based on a point-cloud-generating time instant of one of the point clouds generated by the lidar sensor 13, the computing device 11 performs the method of sensor fusion according to the disclosure to select a target image from among the images captured by the image capturing device 12, wherein an image-capturing time instant of the target image is the closest to the point-cloud-generating time instant of said one of the point clouds. Consequently, content represented by the images captured by the image capturing device 12 and content represented by the point clouds generated by the lidar sensor 13 may be harmonized as much as possible.

It should be noted that the above-mentioned steps may not be implemented in the order in which the steps were described, and at least some of the above-mentioned steps may be implemented at the same time.

To sum up, in the method of sensor fusion according to the disclosure, with respect to each of the point clouds generated by the lidar sensor 13, the computing device 11 selects a candidate image from among the series of images captured by the image capturing device 12, and generates a superimposed image by superimposing, on the candidate image, a two-dimensional data set that is derived from the point cloud. Then, the computing device 11 obtains a derived distance inconsistency between the candidate image and the two-dimensional data set in the superimposed image, feeds the derived distance inconsistency into a conversion model to obtain the derived time difference, and calculates a target time instant based on the derived time difference and the image-capturing time instant of the candidate image. Based on the target time instant, the computing device 11 selects, from among the series of images captured by the image capturing device 12, a target image that matches the point cloud in terms of time (i.e., the image-capturing time instant of the target image is the closest to the point-cloud-generating time instant of the point cloud among the series of images captured by the image capturing device 12). In this way, the content represented by the point clouds generated by the lidar sensor 13 and the content represented by the series of images captured by the image capturing device 12 may be more consistent.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of sensor fusion for harmonizing data from multiple data sources, adapted to be implemented by a computing device that stores a conversion model, the computing device being electrically connected to an image capturing device and a light detection and ranging (lidar) sensor that are mounted on a mobile object, the image capturing device repeatedly capturing a series of images that contain obstacles around the mobile object and transmitting the series of images to the computing device, the lidar sensor repeatedly generating a series of point clouds that represent the obstacles around the mobile object and transmitting the series of point clouds to the computing device, the series of images being captured respectively at a series of image-capturing time instants, each of the point clouds being generated at a point-cloud-generating time instant, the method comprising, with respect to each of the point clouds, steps of:

selecting, from the series of images that have been received from the image capturing device, a candidate image that was captured at an image-capturing time instant corresponding to the point-cloud-generating time instant at which the point cloud was generated;

generating, from the point cloud, a two-dimensional data set that is a two-dimensional representation of the point cloud;

superimposing the two-dimensional data set on the candidate image to result in a superimposed image;

obtaining a derived distance inconsistency between the candidate image and the two-dimensional data set in the superimposed image;

feeding the derived distance inconsistency into the conversion model to obtain a derived time difference;

calculating a target time instant based on the derived time difference and the image-capturing time instant of the candidate image; and selecting, from among the series of images that have been received from the image capturing device, a target image that was captured at a time instant the closest to the target time instant.

2. The method as claimed in claim 1, the computing device further storing a plurality of training data sets, each of the training data sets containing a training time difference and a training distance inconsistency, the method further comprising a step of:

training, based on the training data sets, the conversion model that was established using a machine learning algorithm.

3. The method as claimed in claim 1, wherein the step of generating a two-dimensional data set includes a sub-step of:

converting the point cloud into the two-dimensional data set based on a coordinate-transformation parameter set that is related to coordinate transformation between a three-dimensional coordinate system of the point cloud and a two-dimensional coordinate system of the candidate image.

4. The method as claimed in claim 1, prior to the step of generating a two-dimensional data set, the method further comprising steps of:

performing object clustering on the point cloud to obtain a plurality of groups of data points;

designating the groups of data points respectively as point-cloud objects; and performing object clustering on the candidate image to obtain a plurality of image objects.

5. The method as claimed in claim 4, wherein:

the step of performing object clustering on the point cloud is to perform one of density-based clustering and k-means clustering; and the step of performing object clustering on the candidate image is to perform one of a density-based clustering and a k-means clustering.

6. The method as claimed in claim 4, wherein the step of obtaining a derived distance inconsistency includes sub-steps of:

from among the image objects, selecting a plurality of to-be-compared objects, wherein positions respectively of the to-be-compared objects correspond respectively to positions respectively of multiple ones of the point-cloud objects in the superimposed image;

determining geometric features respectively of the to-be-compared objects;

determining geometric features of the multiple ones of the point-cloud objects;

calculating, with respect to each of the to-be-compared objects, a distance between the geometric feature of the to-be-compared object and the geometric feature of a corresponding one of the multiple ones of the point-cloud objects; and calculating an arithmetic average of the distances corresponding respectively to the to-be-compared objects to serve as the derived distance inconsistency.

7. The method as claimed in claim 4, wherein the step of obtaining a derived distance inconsistency includes sub-steps of:

from among the image objects, selecting at least one to-be-compared object, wherein a position of the to-be-compared object corresponds to a position of one of the point-cloud objects in the superimposed image;

determining a geometric feature of the to-be-compared object;

determining a geometric feature of said one of the point-cloud objects; and calculating a distance between the geometric feature of the to-be-compared object and the geometric feature of said one of the point-cloud objects in the superimposed image to serve as the derived distance inconsistency.

8. The method as claimed in claim 7, wherein:

the sub-step of determining a geometric feature of the to-be-compared object is to determine the geometric feature of the to-be-compared object by using one of a random sample consensus (RANSAC) algorithm and an oriented FAST and rotated BRIEF (ORB) algorithm; and the sub-step of determining a geometric feature of said one of the point-cloud objects is to determine the geometric feature of said one of the point-cloud objects by using one of a RANSAC algorithm and an ORB algorithm.

9. The method as claimed in claim 7, wherein the sub-step of calculating a distance between the geometric feature of the to-be-compared object and the geometric feature of said one of the point-cloud objects is to calculate one of an Euclidean distance and a Mahalanobis distance between the geometric feature of the to-be-compared object and the geometric feature of said one of the point-cloud objects to serve as the derived distance inconsistency.

\* \* \* \* \*